(12) United States Patent
Shi et al.

(10) Patent No.: US 11,031,690 B2
(45) Date of Patent: Jun. 8, 2021

(54) MODULAR ANTENNA SYSTEMS AND RELATED METHODS OF MANUFACTURE

(71) Applicant: Phase Sensitive Innovations, Inc., Newark, DE (US)

(72) Inventors: Shouyuan Shi, Newark, DE (US); Dennis Prather, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 316 days.

(21) Appl. No.: 16/198,670

(22) Filed: Nov. 21, 2018

(65) Prior Publication Data

US 2019/0157758 A1 May 23, 2019

Related U.S. Application Data

(60) Provisional application No. 62/589,534, filed on Nov. 21, 2017, provisional application No. 62/590,066, filed on Nov. 22, 2017.

(51) Int. Cl.
| | |
|---|---|
| *H01Q 3/26* | (2006.01) |
| *H04B 10/2575* | (2013.01) |
| *H01Q 21/00* | (2006.01) |
| *H04B 10/00* | (2013.01) |
| *H04B 10/40* | (2013.01) |

(52) U.S. Cl.
CPC ....... *H01Q 3/2676* (2013.01); *H01Q 21/0025* (2013.01); *H04B 10/00* (2013.01); *H04B 10/2575* (2013.01); *H04B 10/40* (2013.01); *H04B 2210/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,739,334 | A * | 4/1988 | Soref | H01Q 3/2676 342/200 |
| 2006/0239312 | A1 * | 10/2006 | Kewitsch | H01S 5/42 372/29.023 |
| 2014/0022119 | A1 * | 1/2014 | Lohr | G01S 13/02 342/25 R |
| 2017/0025749 | A1 * | 1/2017 | Frye | H01Q 1/48 |
| 2018/0102849 | A1 * | 4/2018 | Morton | H04B 10/25759 |

* cited by examiner

*Primary Examiner* — Omar S Ismail
(74) *Attorney, Agent, or Firm* — Muir Patent Law, PLLC

(57) ABSTRACT

Disclosed herein is a swappable modular-based radiofrequency (RF) frontend that is reconfigurable to form transmitting (TX) and receiving (RX) phased array systems for diverse applications. Such swappable RF frontend may be used with unique spatial and spectral optical processing of complex RF signals over an ultra-wide frequency band. The swappable RF front end may be used in conjunction with an optically upconverted imaging receiver and/or in conjunction with optically addressed phased array technologies transmitters.

21 Claims, 9 Drawing Sheets

US 11,031,690 B2

MODULAR ANTENNA SYSTEMS AND RELATED METHODS OF MANUFACTURE

CROSS-REFERENCE TO RELATED APPLICATIONS

This non-provisional application claims priority to U.S. Provisional Application No. 62/589,534, filed Nov. 21, 2017 and U.S. Provisional Application No. 62/590,066, filed Nov. 22, 2017, the contents of each of which being incorporated by reference in their entirety.

TECHNICAL FIELD

Example embodiments of the present disclosure relate to a novel antenna systems that may be formed in a modular fashion. The antenna systems may include antenna arrays that employ electro-optical converters as elements of a receiver and/or transmitter.

BACKGROUND

Conformal, low profile, and wideband phased antenna arrays have received increasing attention due to their potential to provide multiple functionalities over several octaves of frequency, using shared common apertures for various applications, such as radar and communications.

SUMMARY

Disclosed herein is a swappable modular-based radiofrequency (RF) frontend that may be used in configuring various transmitting (TX) and receiving (RX) phased array antenna systems for diverse applications. Such swappable RF frontend may be used with unique spatial and spectral optical processing of complex RF signals over an ultra-wide frequency band using an optically upconverted imaging receiver and optically addressed transmitting phased array technologies.

Methods of related operations and of manufacturing antenna systems are also disclosed. Other novel improvements disclosed herein may be appreciated from the following detailed disclosure.

BRIEF DESCRIPTION OF DRAWINGS

The above and other aspects and features are reflected in the exemplary embodiments set forth herein, with reference to the accompanying figures in which.

DETAILED DESCRIPTION

Figure 1:
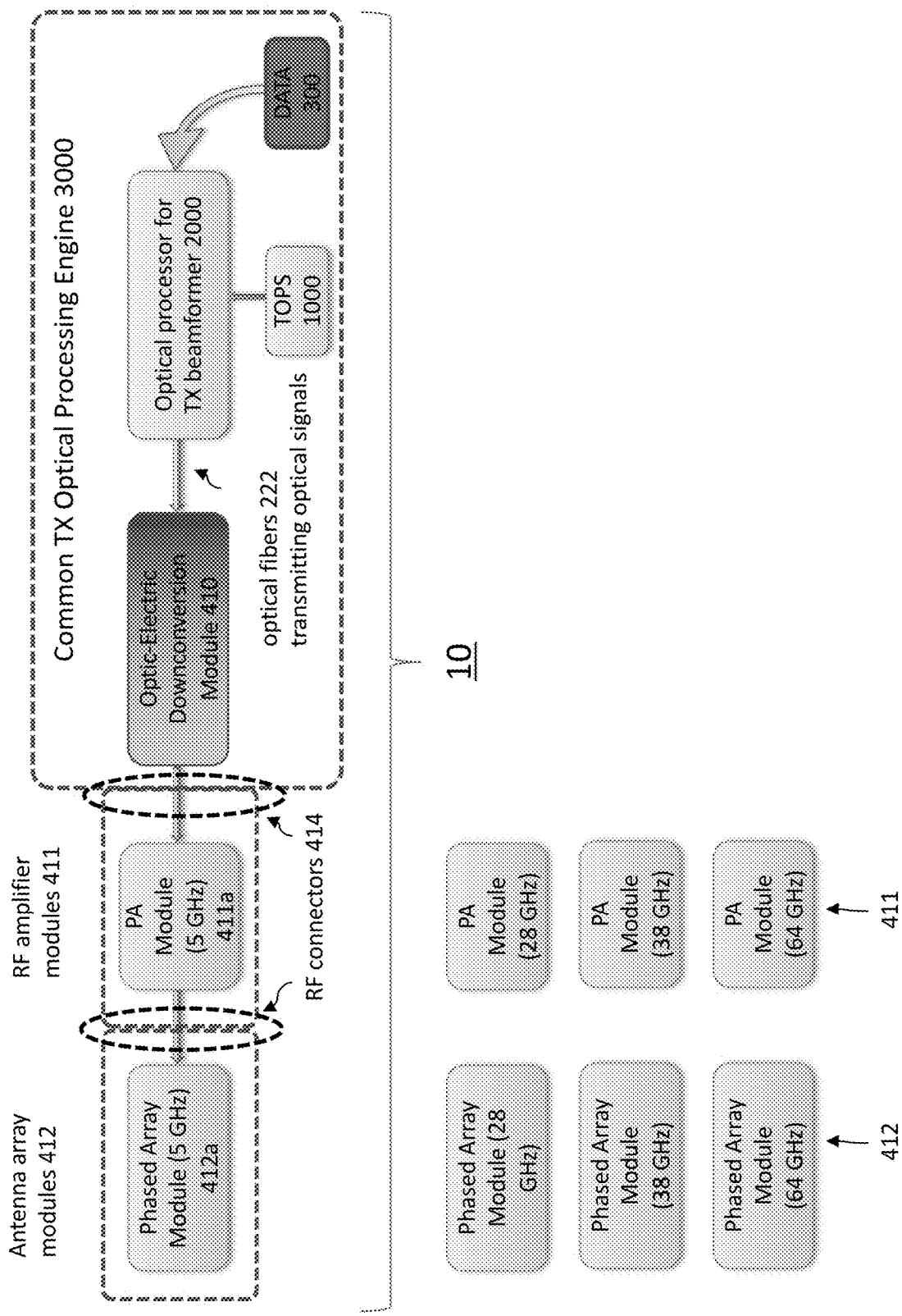
FIGS. 1 to 5 illustrate a one embodiment with FIGS. 1 and 2 illustrating exemplary details of a transmitter, FIGS. 3 and 4 illustrating exemplary details of a receiver and FIG. 5 illustrating exemplary details of a transceiver that includes the receiver and receiver of FIGS. 1 to 4.

The present disclosure now will be described more fully hereinafter with reference to the accompanying drawings, in which various exemplary embodiments are shown. The invention may, however, be embodied in many different forms and should not be construed as limited to the exemplary embodiments set forth herein. These example exemplary embodiments are just that—examples—and many embodiments and variations are possible that do not require the details provided herein. It should also be emphasized that the disclosure provides details of alternative examples, but such listing of alternatives is not exhaustive. Furthermore, any consistency of detail between various exemplary embodiments should not be interpreted as requiring such detail—it is impracticable to list every possible variation for every feature described herein. The language of the claims should be referenced in determining the requirements of the invention.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present.

As used herein, components described as being "electrically connected" are configured such that an electrical signal can be transferred from one component to the other (although such electrical signal may be attenuated in strength as it transferred). Moreover, components that are "directly electrically connected" share a common electrical node through electrical connections by one or more conductors, such as, for example, wires, pads, internal electrical lines, through vias, etc. As such, directly electrically connected components do not include components electrically connected through active elements, such as transistors or diodes.

Spatially relative terms, such as "beneath," "below," "lower," "above," "upper" and the like, may be used herein for ease of description to describe positional relationships, such as illustrated in the figures, e.g. It will be understood that the spatially relative terms encompass different orientations of the device in addition to the orientation depicted in the figures.

Terms such as "same," "equal," "planar," or "coplanar," as used herein encompass near identicality including variations that may occur, for example, due to manufacturing processes. The term "substantially" may be used herein to emphasize this meaning, unless the context or other statements indicate otherwise.

Disclosed herein is a swappable modular-based radiofrequency (RF) frontend that may be used in configuring various transmitting (TX) and receiving (RX) phased array antenna systems for diverse applications. Such swappable RF frontend may be used with unique spatial and spectral optical processing of complex RF signals over an ultra-wide frequency band using an optically upconverted imaging receiver and/or optically addressed transmitting phased array technologies. Antenna systems implementing the swappable modular-based radiofrequency (RF) frontend include antenna transmitters, antenna receivers and antenna transceivers. Exemplary details disclosed in connection with the antenna transmitters and antenna receivers will be understood to equally apply to the transmitting portion and receiving portion, respectively, of transceivers embodiments, and vice versa.

FIGS. 1 to 5 illustrate an exemplary embodiment of the invention. FIG. 1 illustrates an antenna transmitter 10 including a common TX optical processing engine 3000, an RF amplifier module 411a and an antenna array module 412a. The common optical processing engine 3000 is detachably connected to the RF amplifier module 411a by a first set of RF connectors 414. The RF amplifier module 411a is detachably connected to the RF antenna array module 412a by a second set of RF connectors 414. Thus, the common TX optical processing engine 3000, in communication with the RF antenna array module 412a via the RF amplifier module 411a, may operate to control the RF antenna array module 412a.

The common TX optical processing engine 3000 includes a channel encoder 300 that provides data to optical processor 2000. Optical processor 2000 may include an array of electro-optical modulators to combine and modulate phase and/or amplitude of light beams pairs provided from a tunable optical paired source (TOPS) module 1000 and provide the modulated combined light beams to the optic-electric downconversion module 410. The optic-electric downconversion module 410 may comprise an array of photodiodes that are driven by the modulated combined light beams output by optical processor 2000 to provide a corresponding RF electrical signal that is used to control a corresponding antenna element of the antenna array module 412. Prior to providing the RF electrical signals to the antenna elements of the antenna array module 412a, the RF electrical signals may be amplified by corresponding power amplifiers PA of the RF amplifier module 411a. In some examples, the RF amplifier module 411a may be omitted and the common TX optical processing engine 3000 may be directly connected to the antenna array module 412a with RF connectors 414. Further details of exemplary antenna transmitters 10 and their operation (including controlling/altering an RF frequency by controlling/altering a frequency difference of optical beam pairs) may be found in U.S. Provisional Application No. 62/590,066 filed Nov. 22, 2017, U.S. patent application Ser. No. 15/410,761 filed Jan. 19, 2017, U.S. patent application Ser. No. 15/242,459 filed Aug. 19, 2016, and U.S. patent application Ser. No. 16/198,652 filed Nov. 21, 2018 concurrently with the present application, the contents of each of these applications being incorporated by reference.

Also shown in FIG. 1 are several phased array modules 412 and several RF amplifier modules 411 that are unconnected to the common TX optical processing engine 3000. However, all of the phased array modules 412 and several RF amplifier modules 411 may be connected to and operated by the common TX optical processing engine 3000. The common TX optical processing engine 3000, the phased array modules 412 and the RF amplifier modules 411 are designed to be connected together in a modular fashion. The phased array module 412a and the RF amplifier module 411a, may be detachably connected to the common TX optical processing engine 3000 and may be swapped with other ones of the phased array modules 412 and several RF amplifier modules 411.

The common TX optical processing engine 3000 may provide RF signals to a connected antenna array module 412 in the form of an RF beat frequency resulting from the interference of pairs of light beams. Each of the pairs of light beams may have frequencies that differ by an RF carrier frequency that is optimized for the antenna array module 412. The RF carrier frequency may correspond to an RF reference signal (not shown) provided to the TOPS module 1000. Thus, by modifying the RF reference signal provided to the TOPS module 1000, the RF beat frequency provided to the antenna array module (in the form of interfering light beams) may be modified without requiring modification of the transmission system (e.g., optical fibers) providing the RF beat frequency to the antenna array module 412.

The common TX optical processing engine 3000, the phased array modules 412 and the RF amplifier modules 411 may be connected together in a modular fashion. Each of the RF amplifier modules 411 may have an identical input RF connector that may mate with an output RF connector of the common TX optical processing engine 3000. For example, each input RF connector of the amplifier modules 411 may comprise the same number and layout of individual RF connectors that correspond in location and layout (e.g., in a mirror image fashion) to individual output RF connectors of the optical processing engine 3000. In one example, the input RF connector of a selected amplifier module 411 may be connected to the output RF connector of the common TX optical processing engine 3000 via miniaturized SMP (SMPM) connectors (a subminiature push-on, micro connector), for board-to-board connection.

Similarly, each of the RF amplifier modules 411 may have an identical output RF connector and each of the RF antenna array modules 412 may have an identical input RF connector. The output RF connectors of the amplifier modules 411 may comprise the same number and layout of individual RF connectors that correspond in location and layout (e.g., in a mirror image fashion) to individual input RF connectors of each of RF antenna array modules 412. In one example, the output RF connector of a selected amplifier module 411 may be connected to the input RF connector of a selected RF antenna array modules 412 via miniaturized SMP (SMPM) connectors (a subminiature push-on, micro connector), for board-to-board connection.

In assembling and/or manufacturing the antenna transmitter 10, a manufacturer, user, customer, etc. may select a desired antenna array module 412 and an RF amplifier module 411, such as based on desired RF frequency transmissions. The selected RF amplifier module 411 may be plugged into the common TX optical processing engine 3000 via the RF connectors described herein and the selected antenna array module 412 may be plugged into the selected amplifier module 411. Such connections between the common TX optical processing engine 3000, the RF amplifier module 411 and the phased array module 412 may be performed so that all individual RF connections between the two corresponding RF connectors may be made at the same time (e.g., by simply pressing the two corresponding RF connectors together to mate all individual RF connections at the same time). The connected modules 411, 412 may be separated from each other with similar ease. Although the modules 411, 412 and the optical processing engine 3000 may have their corresponding RF connectors removably connected to one another (which may be sufficient for providing both electrical and physical connections therebetween), additional physical connectors may be desired (e.g., clamps between the different modules) to strengthen the physical connections.

As part of assembling the antenna transmitter 10, in response to the selection of the antenna array module 412 and amplifier module 411, the optical processing engine 3000 may be configured in response thereto. For example, the optical processing engine 3000 may receive a mode selection from a user or otherwise be programmed corresponding to the selection of the antenna array module 412 and amplifier module 411. The mode selection may configure the optical processing engine 3000 to control the selected antenna array module 412 to operate at a RF carrier frequency (or RF carrier frequency band) corresponding to the selected antenna array module 412 and/or amplifier module 411. For example, the optical processing engine 3000 may be put in a first mode to operate antenna array module 412a with a RF carrier frequency of 5 GHz (or at a RF carrier frequency band centered about or including 5 GHz), which may correspond to an optimal operational frequency of the antenna array module 412a (e.g., antenna radiating elements of the antenna array module 412a may have a length of one half of a wavelength of electromagnetic radiation corresponding to the RF carrier frequency of 5 GHz).

If a different antenna array module 412 and amplifier module 411 are later selected corresponding to a different RF carrier frequency (e.g., one of 28 GHz, 38 GHz or 64 GHz in this example), the optical processing engine 3000 may be put into a different mode corresponding to this selection, e.g., by a mode selection input by a user or by reprogramming by a user (user interface to receive user mode selection or reprogramming of common TX optical processing engine 3000 not shown in FIG. 1). The mode selection may cause the RF reference signal provided to the TOPS module 1000 to change frequency to alter the wavelength offset (or wavelength differences) between the optical beam pair(s) provided by the TOPS module 1000. The resulting RF signals provided in the form of a beat frequency of interfering light beams may thus be altered in a simple manner.

As another example, the mode selection by a user corresponding to the selection of the antenna array module 412 and amplifier module 411 may cause modification of calibration data used by the optical processing engine 3000, such as calibration values used to calibrate phases RF signals provided by the optical processing engine 3000 (provided as beat frequencies as discussed elsewhere herein). Calibration of the phases of the RF signals provided by the optical processing engine 3000 may cause these RF signals to be in phase absent any modulation responsive to encoder 300.

Thus, the transmitter 10 provides a common TX optical processing engine 3000 that may be used with antenna array module 412 and amplifier module 411 that are designed for different operating frequencies (i.e., different RF carrier frequencies/frequency bands). It will be appreciated that operation of the different antenna array modules 412 and amplifier modules 411 may not be optimum (or even operable) if provided with RF signals of frequencies intended for other antenna array modules 412 and amplifier modules 411. However, the common TX optical processing engine 3000 is configurable to easily change the RF signal frequencies provided to the antenna array modules 412 and amplifier modules 411 via mode selection or reprogramming.

Figure 2:
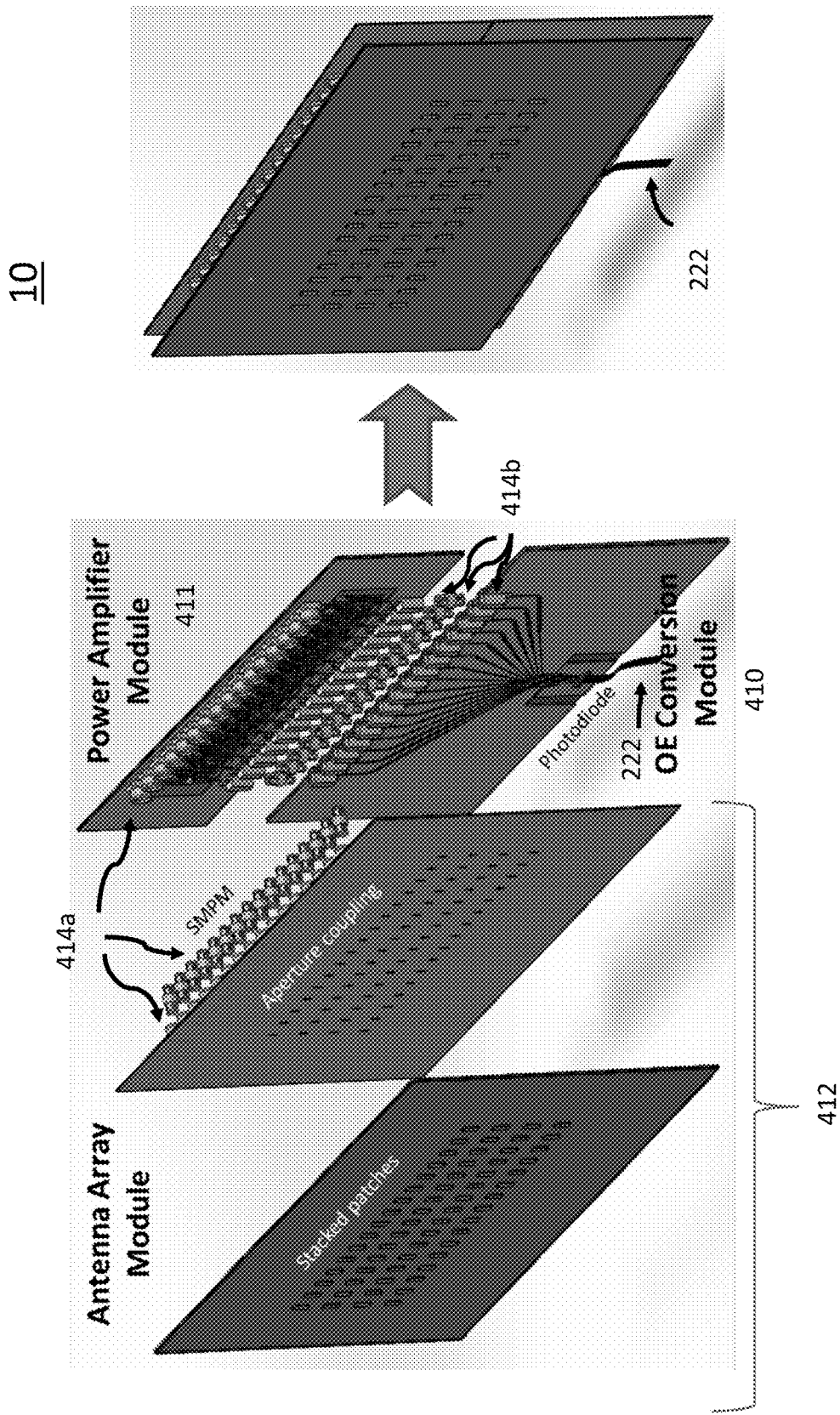

FIG. 2 illustrates exemplary details of the physical features of an antenna transmitter 10 according to one embodiment. The left side of FIG. 2 illustrates an exploded view of the element of antenna transmitter and is representative of the structure of this antenna transmitter 10 prior to assembly. The right side of FIG. 2 illustrates the configuration of the antenna transmitter 10 after assembly. As will be appreciated, the assembled antenna transmitter 10 has a low profile, which can have a thickness of less than 20 mm, such as 10 mm or less, e.g. RF connectors 414a connect antenna array module 412 to power amplifier module 411 and RF connectors 414b connect power amplifier module 411 to the opto-electric conversion module 410 of the common TX optical processing engine 3000. The opto-electric conversion module 410 may be connected to the remainder of the TX optical processing engine 3000 via optical fibers.

In this example, RF connectors 414a of the antenna array module 412 and power amplifier module 411 are both female connectors connected together with SMPM RF connectors (plug type). Each of these female RF connectors 414a has the individual RF connectors (forming the larger female RF connector) aligned and extending perpendicular from the planar substrate (which may be a printed circuit board) of the corresponding module 411, 412. Each of these female RF connectors 414a of modules 411, 412 may be fixed to the substrate of the module 411, 412 so that the individual RF connectors forming the larger female RF connector 414a maintain a fixed positional relationship (e.g., linearly arrayed and having connecting ends terminating at the same plane).

RF connectors 414b of the power amplifier module 411 and the opto-electric conversion module 410 in this example are also female connectors connected by SMPM RF connectors. Each of these female RF connectors 414b has the individual RF connectors (forming the larger female RF connector) aligned and extending parallel to the planar substrate and along an edge of the planar substrate of the corresponding module 410, 411. Each of these female RF connectors 414b of modules 410, 411 may be fixed to the substrate of the corresponding module 410, 411 so that the individual RF connectors forming the larger female RF connector 414b maintain a fixed positional relationship (e.g., linearly arrayed and having connecting ends terminating at the same plane).

Figure 3:
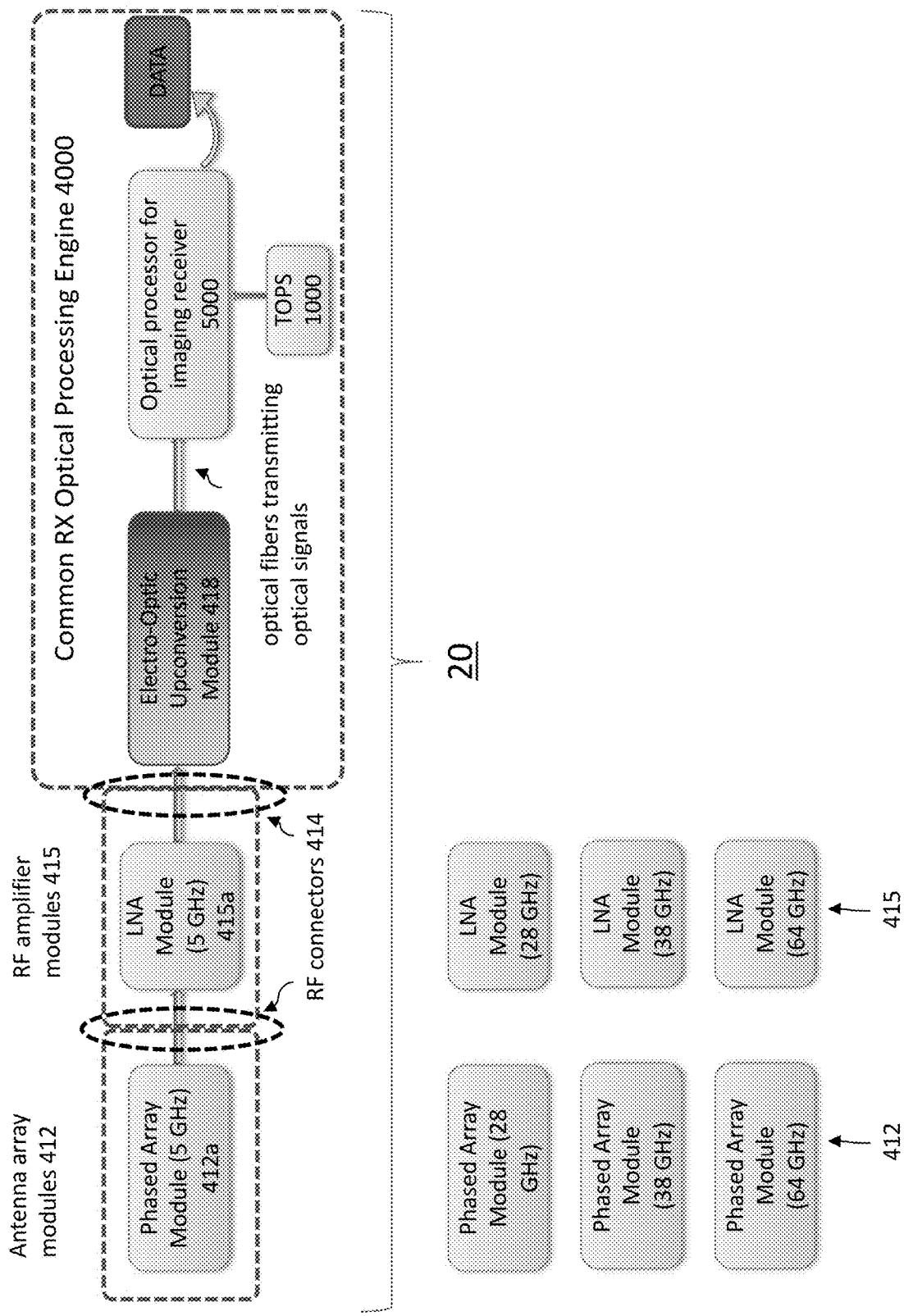

The receiving phased array (receiver) may be implemented as an imaging receiver, providing analog beam forming to all received RF signals that are upconverted to the optical domain using an analog process that preserves spatial coherence over the entire array. Ultrawideband electro-optic (EO) modulators are components in this optical processor. See, for example, U.S. patent application Ser. No. 14/791,351 filed Jul. 3, 2015 and issued as U.S. Pat. No. 9,525,489 on Dec. 20, 2016, incorporated by reference in its entirety, showing exemplary details of an imaging receiver, including exemplary antenna arrays, an optical processing engine (an optical processor) and the components therebetween. Other receiving phased arrays may be implemented, such as that described in U.S. patent application Ser. No. 15/227,859 filed Aug. 3, 2016, the contents of which are hereby incorporated by reference FIG. 3 illustrates an antenna receiver 20 including a common RX optical processing engine 4000, an RF amplifier module 415a and an antenna array module 412a. The common optical processing engine 4000 is detachably connected to the RF amplifier module 415a by a first set of RF connectors 414. The RF amplifier module 415a is detachably connected to the RF antenna array module 412a by a second set of RF connectors 414. Thus, the common RX optical processing engine 4000, in communication with the RF antenna array module 412a via the RF amplifier module 415a, may operate to receive and process RF signals received by the RF antenna array module 412a For example, after RF signals received by the antenna array module 412a is amplified by the RF amplifier module 415a, an electro-optic upconversion module 418 of the common RX optical processing engine 4000 may upconvert the RF signals to corresponding light signals via modulation which may be used, e.g., to extract an image of an RF scene. RF sources of the RF scene may be identified and encoded data may be extracted by the optical processor of the imaging receiver 5000.

Like the transmitter 10 described with respect to FIGS. 1 and 2, the common optical processing engine 4000 may operate with different RF antenna array modules 412 and different RF amplifier modules 415. The different modules 412, 415 may be swappable and with detachable connections as described with respect to transmitter 10 and a repetitive description is not repeated here.

It should be appreciated that the same RF antenna array modules 412 may be selected for use with either the transmitter 10 or the receiver 20. To facilitate such use, connectors of the amplifier modules 411 and 415 that mate with the RF antenna array modules 412 may be identical with each other. However, other implementations may select from different sets of RF antenna array modules for assembling a transmitter 10 or a receiver 20.

Figure 4:
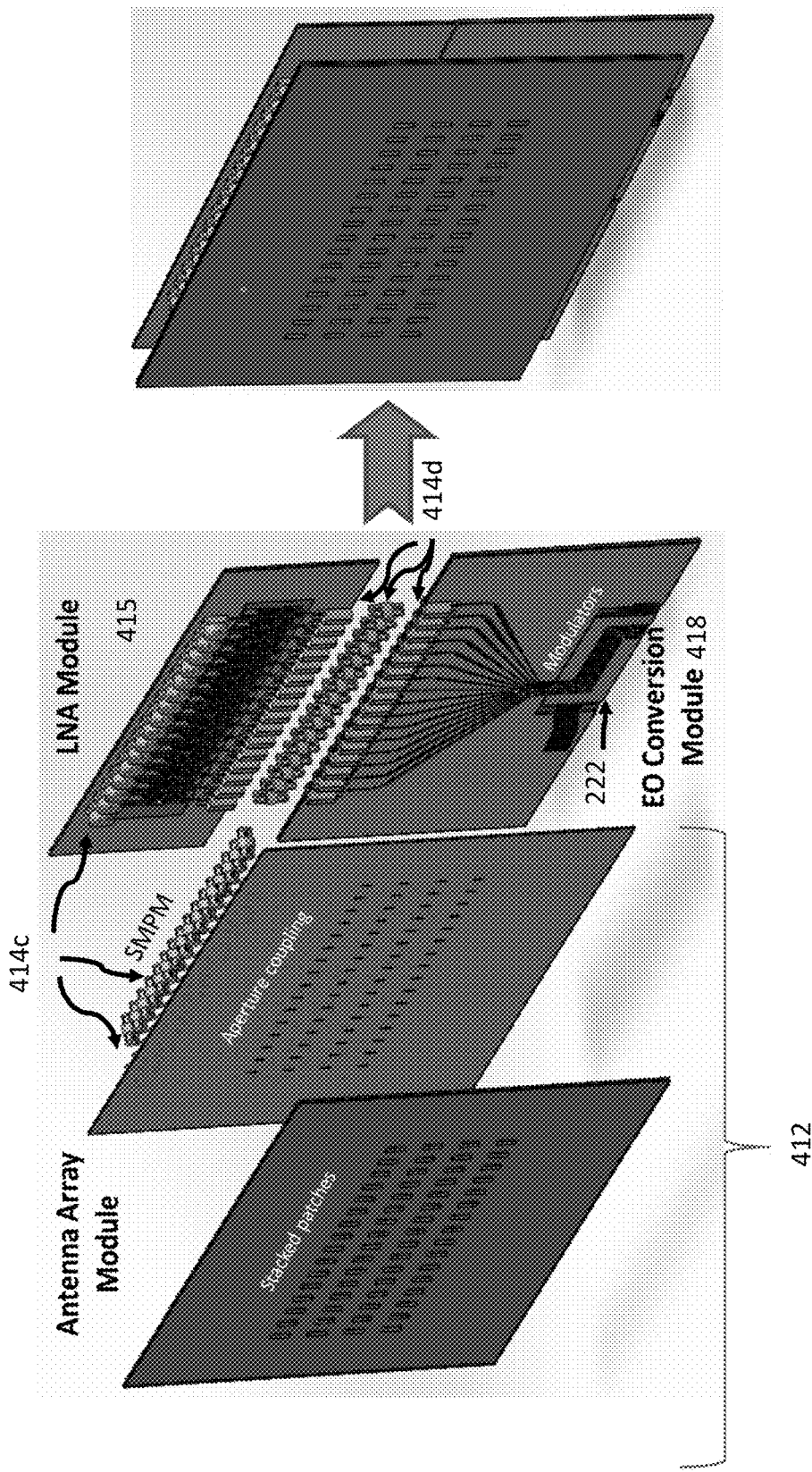

FIG. 4 illustrates exemplary details of the physical features of an antenna receiver 20 according to one embodiment. The left side of FIG. 4 illustrates an exploded view of the element of antenna receiver 20 and is representative of the structure of this antenna receiver 20 prior to assembly. The right side of FIG. 2 illustrates the configuration of the antenna receiver 20 after assembly. As will be appreciated, the assembled antenna receiver 20 has a low profile, which can have a thickness of less than 20 mm, such as 10 mm or less, e.g. RF connectors 414c connect antenna array module 412 to low noise amplifier module 415 and RF connectors 414d connect low noise amplifier module 415 to the electro-optic conversion module of the common RX optical processing engine 4000. The electro-optic conversion module may be connected to the remainder of the RX optical processing engine 4000 via optical fibers. RF connectors 414c and 414d may have a similar configuration, be similarly connected to the substrates of the corresponding modules 412, 415 and similarly connect the modules 412, 415 in the same way as described with respect connectors 414a, 414b of the antenna transmitter 10 and a repetitive description is omitted here.

Figure 5:
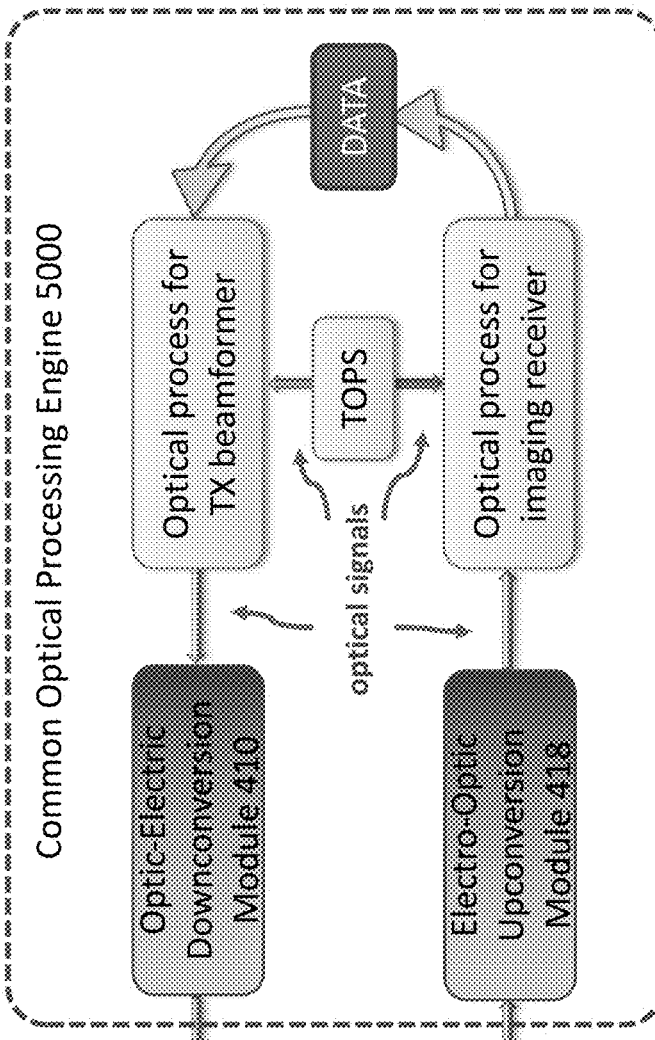

FIG. 5 illustrates an example where the transmitter 10 of FIG. 1 and the receiver 20 of FIG. 3 are combined as part of a single transceiver 30. Structure and operation of the transmitter and receiver 20 may be the same as that described herein. Note that the DATA illustrated in FIG. 5 may be different from what is extracted via the receiver 20 and what is transmitted by the transmitter 10.

The EO upconversion module, the OE downconversion module, and/or the optical-based backend processor may be provided as a common optical processing engine in both TX and RX phased arrays such that it may be used with different antenna arrays having different RF personalities. As disclosed herein, an optical processing engine may allow the backend processor to integrate different RF frontend modules with respective RF personalities, such having different frequency bandwidths, radiation power, gain, and beam steering characteristics. A variety of RF phased array modules can be developed to meet the desired requirement. To improve the signal fidelity, a low noise amplifier (LNA) and power amplifier (PA) modules are incorporated into TX and RX systems. In some examples, low noise amplifier (LNA) and power amplifier (PA) modules need not be implemented and antenna array modules may directly connect to the optical processing engine, and/or more directly connect to an EO upconversion module or the OE downconversion module as appropriate. As with the remaining portions of the optical processing engine, each EO upconversion module and each OE downconversion module may operate with different antenna arrays that are operable at different frequencies, such as those frequencies described herein.

Each RF module may be built on high-frequency substrates. The RF connection between different RF modules can be realized via advanced RF connectors, i.e., miniaturized SMP (SMPM) connectors (a subminiature push-on, micro connector), for board-to-board connection. SMPM are designed for direct snap-on connection over a frequency up to 67 GHz with a minimal insertion loss. The connectors is able to self-align to withstand radial and axial misalignment inherent with board-to-board mating. In addition, smaller feature, <30% of SMP designs, enables dense integration of a high frequency phased array.

The convenient interconnect using the SMPM adaptor array between the common optical engine and RF frontend module allows easy swapping and use of different RF frontends with the same optical processing engine by choosing different RF phased array, LNA and PA modules that are suitable to a designated application.

Figure 6:
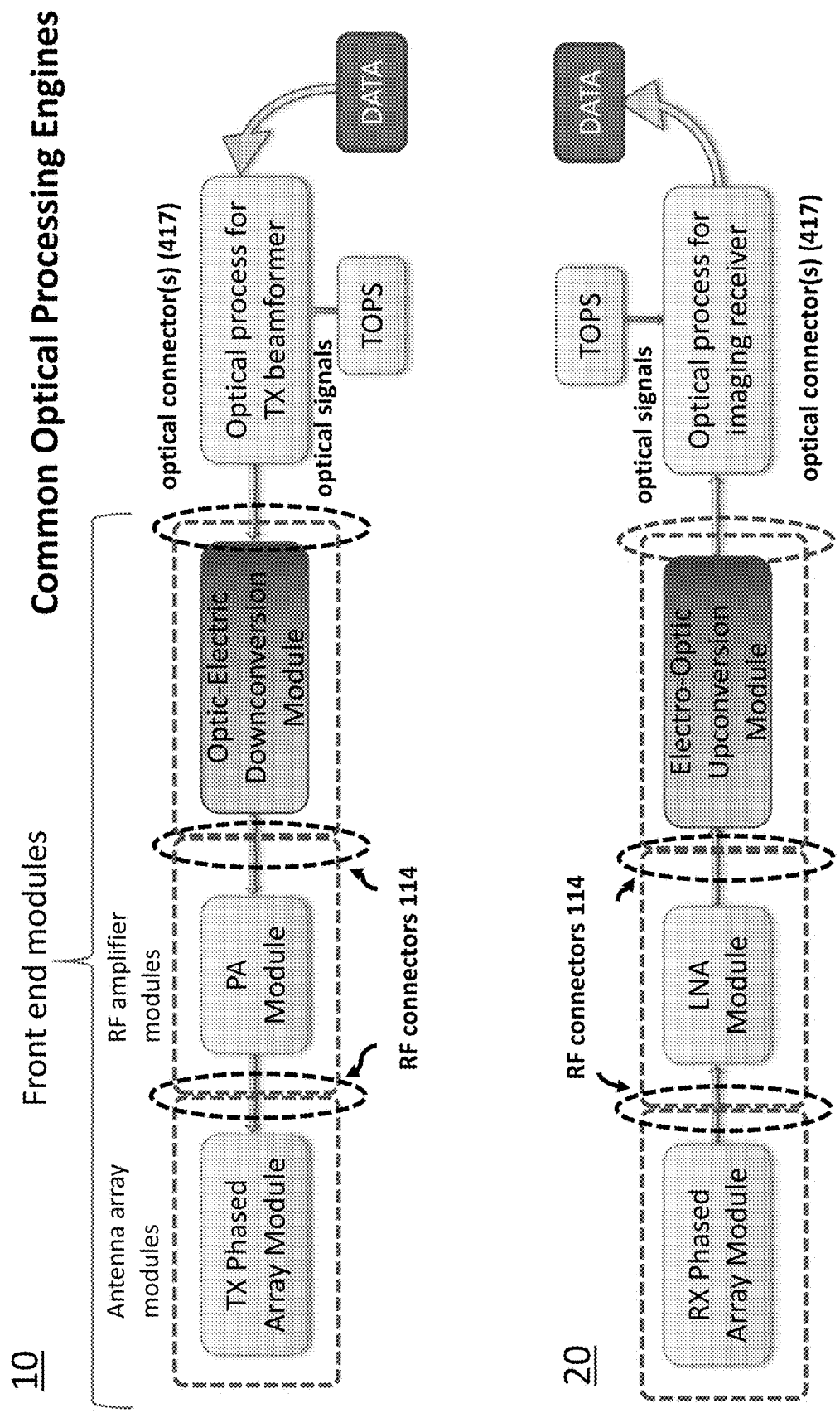
FIG. 6 illustrates an example where an opto-electrical downconversion module of the transmitter and the electro-optical upconversion module of the receiver are swappable.

In some examples, other elements of the receiver, transmitter and transceiver may be made modular and be swappable as described with respect to the antenna array modules and the RF amplifier modules 411, 415. FIG. 6 illustrates an example where the opto-electrical downconversion module of the transmitter 10 and the electro-optical upconversion module 418 of the receiver 20 are removably attached to the remaining portions of the corresponding common optical processing engine (via mated optical connectors) and to a corresponding amplifier module (via mated RF connectors). Such alternative configuration may be provided as part of the transmitter 10, receiver 20 or transceiver 30 described herein.

Figure 7:
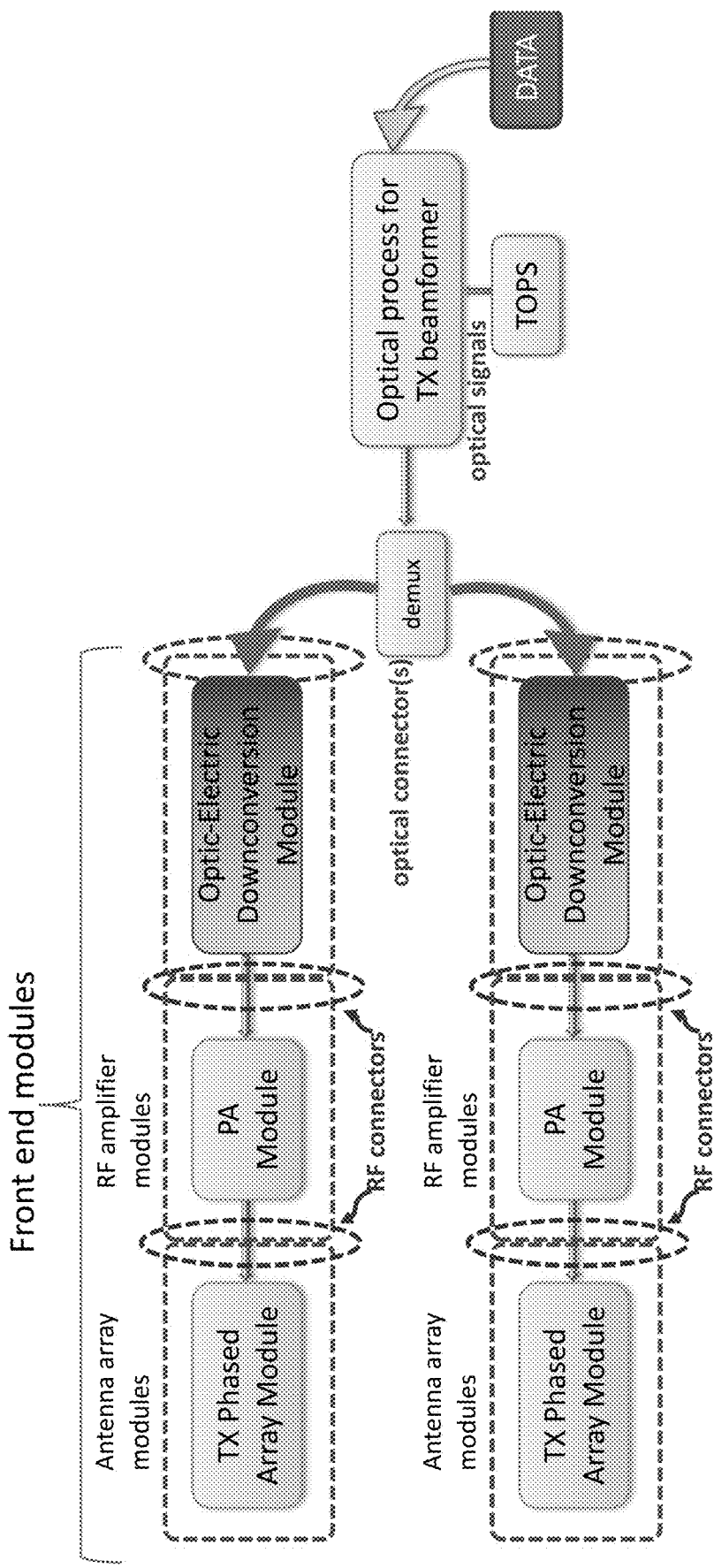
FIGS. 7 and 8 respectively illustrate a transmitter and receiver that may switch between use of different front ends with a common optical processing engine.
Figure 8:
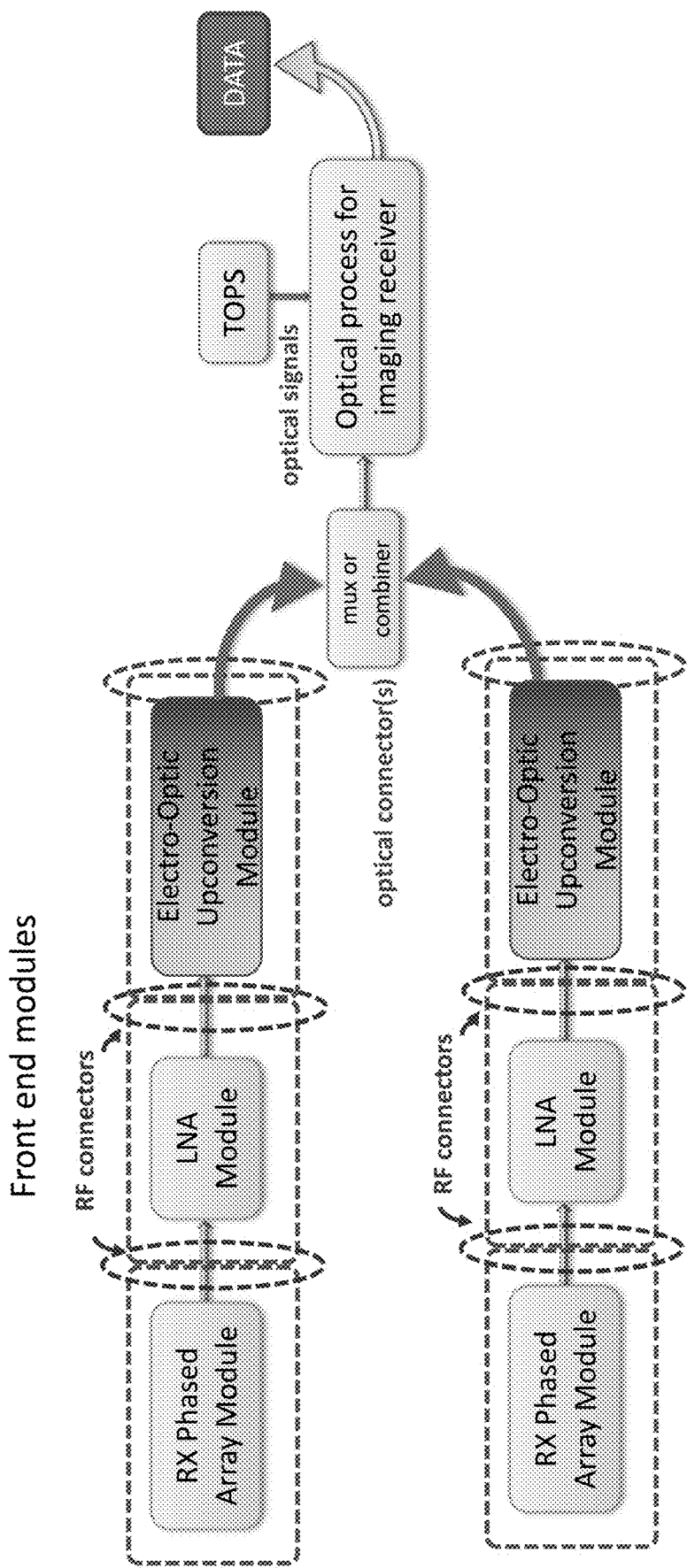

In some examples, switching front end modules need not result in physical replacement. FIG. 7 illustrates an example of a receiver using a common optical processing engine that may switch between different TX antenna array modules. Switching between the different TX antenna array modules may be implemented by switches, such as an optical demultiplexer that may be controlled to select which of several front end modules should be used for RF transmission. Two switchable antenna array modules are shown in FIG. 7, but the number may be significantly more than two (e.g., 5 or more). Each of the front end modules (and different antenna array modules) may be configured to operate at a different RF carrier frequency band. Remaining features of the transmitter 10 of FIG. 7 may be the same as described elsewhere herein. FIG. 8 illustrates an example of a RX antenna array that may use a common optical processing engine that may switch between different front end modules by use of a demultiplexer. Alternatively, several front end modules may have optical signals (corresponding to the RF signals obtained from different antenna arrays combined and processed simultaneously by the optical processing engine. Digital filtering may be used in this instance if desired.

Figure 9:
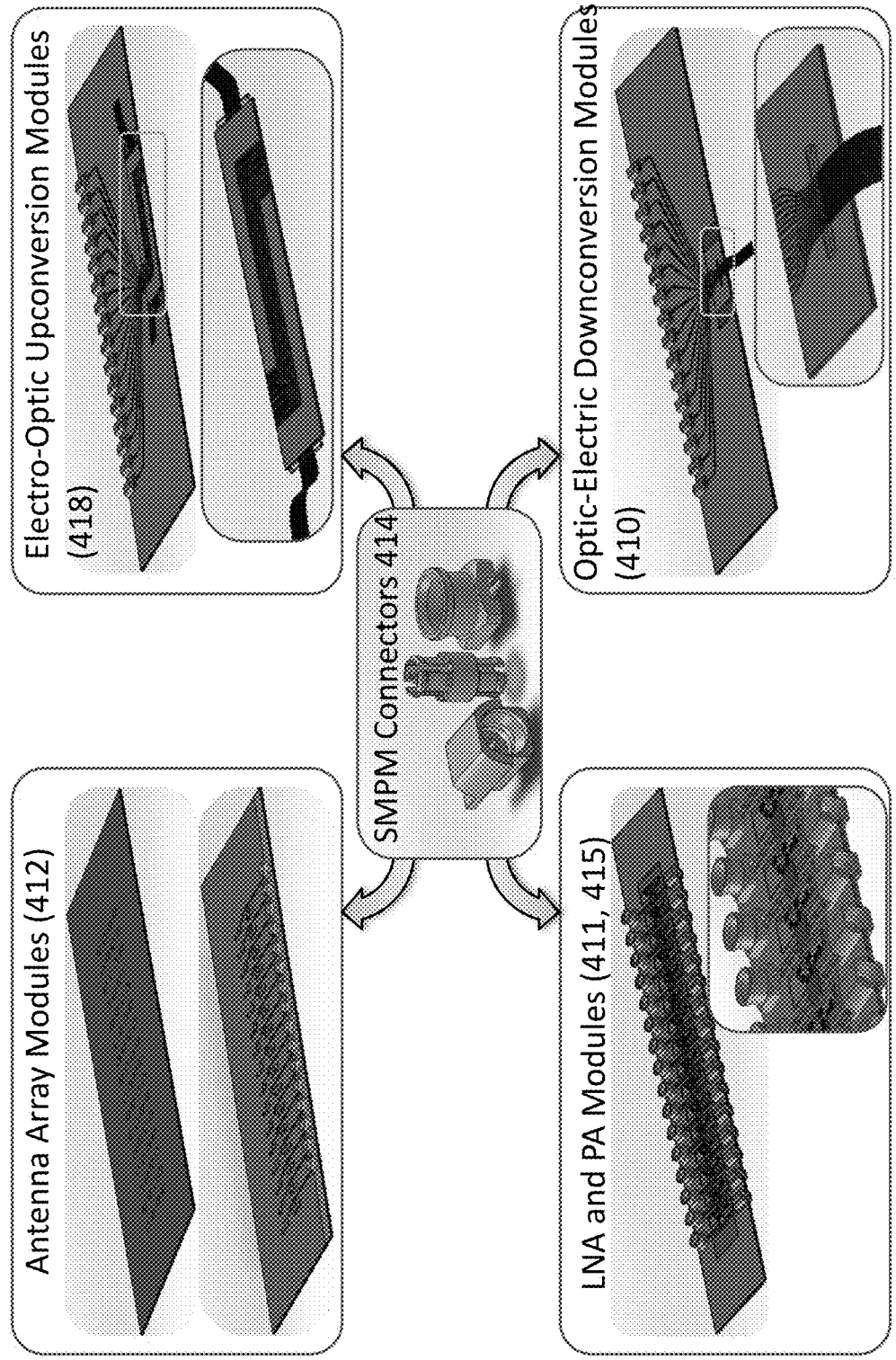
FIG. 9 illustrates a kit and related method of manufacturing according to certain embodiments.

In some examples, the invention may be provided in the form of a kit. In the exemplary embodiment of FIG. 9, a kit may comprise one or more of the common optical processing engines described herein (not shown in FIG. 9) (such as 3000, 4000 and 5000), one or a plurality of antenna array modules (412), LNA and PA Modules (411, 415), optic-electric downconversion modules (410) and/or electro-optic upconversion modules (418). The optical processing engines (3000, 4000, 5000) and modules (410, 411, 412, 415 and 418) may be detachably connectable and thus swappable as described herein. In some examples, a transmitter 10, receiver 20 and/or a transceiver 30 may be manufactured by assembling the appropriate optical processing engine and modules, such as described elsewhere herein.

It is emphasized that the descriptions herein are exemplary and deviations from which will be recognized to fall within the scope of the invention as set forth in the claims of this application.

What is claimed is:

1. A modular radio frequency (RF) transmitter comprising:
   an optical processing engine including
      an optical processor including an array of electro-optical modulators to combine and modulate at least one of phase and amplitude of light beam pairs, and
      an opto-electrical downconversion module including an array of photodiodes that are driven by the combined and modulated light beam pairs to generate an RF electrical signal;
   an RF amplifier module detachably connected to the optical processing engine via a first set of a plurality of RF connectors and configured to amplify the RF electrical signal; and
   an RF antenna array module detachably connected to the RF amplifier module via a second set of a plurality of RF connectors and configured to control, based on the amplified RF electrical signal, an RF antenna element of the RF antenna array module,
   wherein the opto-electrical downconversion module is formed on a first printed circuit board, the RF amplifier module is formed on a second printed circuit board, and the RF antenna array module is formed on a third printed circuit board,
   the first set of the plurality of RF connectors include a first set of a plurality of connectors located on the first printed circuit board, a second set of a plurality of connectors located on the second printed circuit board, and a first set of a plurality of push-on connectors connecting the first set of the plurality of connectors to the second set of the plurality of connectors, and
   the second set of the plurality of RF connectors include a third set of a plurality of connectors located on the second printed circuit board, a fourth set of a plurality of connectors located on the third printed circuit board, and a second set of a plurality of push-on connectors connecting the third set of the plurality of connectors to the fourth set of the plurality of connectors.

2. The modular RF transmitter of claim 1, wherein the optical processing engine further includes a pair of lasers with a wavelength offset of a first offset beat frequency configured to generate the light beam pairs.

3. The modular RF transmitter of claim 2, wherein the optical processing engine is configured, based on a switchable operating mode, to adjust the wavelength offset.

4. The modular RF transmitter of claim 1, wherein
   the first set of the plurality of RF connectors are configured to electronically connect to any one of a plurality of RF amplifier modules each one of which operate at a different one of a plurality of different RF carrier frequencies, and
   the second set of the plurality of RF connectors are configured to electronically connect to any one of a plurality of RF antenna array modules each one of which operate at a different one of the plurality of different RF carrier frequencies.

5. The modular RF transmitter of claim 4, wherein the optical processing engine is configured, based on a switchable operating mode, to operate at one of the plurality of different RF carrier frequencies corresponding to an operating frequency of the electronically connected RF amplifier module and an operating frequency of the electronically connected RF antenna array module.

6. The modular RF transmitter of claim 4, wherein the optical processing engine is configured, based on a switchable operating mode, to operate at a frequency band that includes one of the plurality of different RF carrier frequencies corresponding to the operating frequency of the electronically connected RF amplifier module and the operating frequency of the electronically connected RF antenna array module.

7. The modular RF transmitter of claim 4, wherein the plurality of different RF carrier frequencies include 28 GHz, 38 GHz, and 64 GHz.

8. The modular RF transmitter of claim 1, wherein
   the first set of the plurality of push-on connectors and the second set of the plurality of push-on connectors are subminiature push-on micro (SMPM) connectors.

9. A modular radio frequency (RF) receiver comprising:
   an RF antenna array module, including a plurality of antenna elements, detachably connected to an RF amplifier module via a first set of a plurality of RF connectors and configured to receive RF signals from an external source;
   the RF amplifier module configured to amplify the RF signals; and
   an optical processing engine, detachably connected to the RF amplifier via a second set of a plurality of RF connectors, including
      an electro-optical upconversion module configured to receive the amplified RF signals and, using light beam pairs, convert the amplified RF signals into optical signals, and
      an optical processor configured to extract an image of an RF scene from the optical signals,
   wherein the RF antenna array module is formed on a first printed circuit board, the RF amplifier module is formed on a second printed circuit board, and the electro-optical upconversion module is formed on a third printed circuit board,
   the first set of the plurality of RF connectors include a first set of a plurality of connectors located on the first printed circuit board, a second set of a plurality of connectors located on the second printed circuit board, and a first set of a plurality of push-on connectors connecting the first set of the plurality of connectors to the second set of the plurality of connectors, and
   the second set of the plurality of RF connectors include a third set of a plurality of connectors located on the second printed circuit board, a fourth set of a plurality of connectors located on the third printed circuit board, and a second set of a plurality of push-on connectors connecting the third set of the plurality of connectors to the fourth set of the plurality of connectors.

10. The modular RF receiver of claim 9, wherein the optical processing engine further includes a pair of light sources with a wavelength offset of a first offset beat frequency configured to generate the light beam pairs.

11. The modular RF receiver of claim 9, wherein
   the first set of the plurality of RF connectors are configured to electronically connect to any one of a plurality of RF antenna array modules each one of which operate at one of a plurality of different RF carrier frequencies, and the second set of the plurality of RF connectors are configured to electronically connect to any one of a plurality of RF amplifier modules each one of which operate at one of a plurality of different RF carrier frequencies.

12. The modular RF receiver of claim 11, wherein the optical processing engine is configured, based on a switchable operating mode, to operate at one of the plurality of different RF carrier frequencies corresponding to an operating frequency of the electronically connected RF amplifier module and an operating frequency of the electronically connected RF antenna array module.

13. The modular RF receiver of claim 11, wherein the optical processing engine is configured, based on a switchable operating mode, to operate at a frequency band that includes one of the plurality of different RF carrier frequencies corresponding to the operating frequency of the electronically connected RF amplifier module and the operating frequency of the electronically connected RF antenna array module.

14. The modular RF receiver of claim 11, wherein the plurality of different RF carrier frequencies include 28 GHz, 38 GHz, and 64 GHz.

15. A modular radio frequency (RF) transceiver comprising:
a first optical processor including an array of electro-optical modulators to combine and modulate at least one of phase and amplitude of light beam pairs;
an opto-electrical downconversion module including an array of photodiodes that are driven by the combined and modulated light beam pairs to generate an RF electrical signal;
a first RF amplifier module detachably connected to the opto-electrical downconversion module via a first set of a plurality of RF connectors and configured to amplify the RF electrical signal;
a first RF antenna array module detachably connected to the first RF amplifier module via a second set of a plurality of RF connectors and configured to control, based on the amplified RF electrical signal, an RF antenna element of the RF antenna array module;
a second RF antenna array module, including a plurality of antenna elements, detachably connected to the second RF amplifier module via a third set of a plurality of RF connectors;
a second RF amplifier module configured to amplify the RF signals and detachably connected to an electro-optical upconversion module via a fourth set of a plurality of RF connectors; and
the electro-optical upconversion module configured to receive the amplified RF signals and, using the light beam pairs, convert the amplified RF signals into optical signals,
a second optical processor configured to extract an image of an RF scene from the optical signals, wherein
the first set of the plurality of RF connectors are configured to electronically connect to any one of a plurality of first RF amplifier modules each one of which operate at one of a plurality of different RF carrier frequencies,
the fourth set of the plurality of RF connectors are configured to electronically connect to any one of a plurality of second RF amplifier modules each one of which operate at one of the plurality of different RF carrier frequencies,
the second set of the plurality of RF connectors are configured to electronically connect to any one of a plurality of first RF antenna array modules each one of which operate at one of the plurality of different RF carrier frequencies, and
the third set of the plurality of RF connectors are configured to electronically connect to any one of a plurality of second RF antenna array modules each one of which operate at one of the plurality of different RF carrier frequencies.

16. The modular RF transceiver of claim 15, wherein the first optical processor and the second optical processor are configured, based on a switchable operating mode, to operate at one of the plurality of different RF carrier frequencies corresponding to an operating frequency of the electronically connected first and second RF amplifier modules and an operating frequency of the electronically connected first and second RF antenna array modules.

17. The modular RF transceiver of claim 15, wherein the first optical processor and the second optical processor are configured, based on a switchable operating mode, to operate at a frequency band that includes one of the plurality of different RF carrier frequencies corresponding to the operating frequency of the electronically connected first and second RF amplifier modules and the operating frequency of the electronically connected first and second RF antenna array modules.

18. The modular RF transceiver of claim 15, wherein the opto-electrical downconversion module is formed on a first printed circuit board, the first RF amplifier module is formed on a second printed circuit board, the first RF antenna array module is formed on a third printed circuit board, the second RF antenna array module is formed on a fourth printed circuit board, the second RF amplifier module is formed on a fifth printed circuit board, and the electro-optical upconversion module is formed on a sixth printed circuit board.

19. The modular RF transceiver of claim 18, wherein
the first set of the plurality of RF connectors include a first set of a plurality of connectors located on the first printed circuit board, a second set of a plurality of connectors located on the second printed circuit board, and a first set of a plurality of push-on connectors connecting the first set of the plurality of connectors to the second set of the plurality of connectors,
the second set of the plurality of RF connectors include a third set of a plurality of connectors located on the second printed circuit board, a fourth set of a plurality of connectors located on the third printed circuit board, and a second set of a plurality of push-on connectors connecting the third set of the plurality of connectors to the fourth set of the plurality of connectors,
the third set of the plurality of RF connectors include a fifth set of a plurality of connectors located on the fourth printed circuit board, a sixth set of a plurality of connectors located on the fifth printed circuit board, and a third set of a plurality of push-on connectors connecting the fifth set of the plurality of connectors to the sixth set of the plurality of connectors, and
the fourth set of the plurality of RF connectors include a seventh set of a plurality of connectors located on the fifth printed circuit board, an eight set of a plurality of connectors located on the sixth printed circuit board, and a fourth set of a plurality of push-on connectors connecting the seventh set of the plurality of connectors to the eight set of the plurality of connectors.

20. A modular radio frequency (RF) transmitter comprising:
an optical processing engine including an optical processor including an array of electro-optical modulators to combine and modulate at least one of phase and amplitude of light beam pairs, and an opto-electrical downconversion module including an array of photodiodes that are driven by the combined and modulated light beams to generate an RF electrical signal; and an RF antenna array module detachably connected to the optical processing engine via a set of a plurality of RF connectors and configured to control, based on the RF electrical signal, an RF antenna element of the RF antenna array module, wherein the opto-electrical downconversion module is formed on a first printed circuit board and the RF antenna array module is formed on a second printed circuit board, the set of the plurality of RF connectors include a first set of a plurality of connectors located on the first printed circuit board, a second set of a plurality of connectors located on the second printed circuit board, and a first set of a plurality of push-on connectors connecting the first set of the plurality of connectors to the second set of the plurality of connectors.

21. A method of operating a modular radio frequency (RF) transmitter comprising: combining and modulating, using an optical processor including an array of electro-optical modulators, at least one of phase and amplitude of light beam pairs; generating, using an opto-electrical downconversion module including an array of photodiodes that are driven by the combined and modulated light beams, an RF electrical signal; and controlling, using an RF antenna array module detachably connected to the optical processing engine via a set of a plurality of RF connectors, an RF antenna element of the RF antenna array module based on the RF electrical signal, wherein the opto-electrical downconversion module is formed on a first printed circuit board and the RF antenna array module is formed on a second printed circuit board, the set of the plurality of RF connectors include a first set of a plurality of connectors located on the first printed circuit board, a second set of a plurality of connectors located on the second printed circuit board, and a first set of a plurality of push-on connectors connecting the first set of the plurality of connectors to the second set of the plurality of connectors.

* * * * *